(12) United States Patent
Margalit

(10) Patent No.: US 9,245,307 B2
(45) Date of Patent: Jan. 26, 2016

(54) STRUCTURED LIGHT PROJECTION FOR MOTION DETECTION IN AUGMENTED REALITY

(75) Inventor: Mordehai Margalit, Zichron Yaa'kov (IL)

(73) Assignee: Empire Technology Development LLC, Wilmington, DE (US)

( * ) Notice: Subject to any disclaimer, the term of this patent is extended or adjusted under 35 U.S.C. 154(b) by 878 days.

(21) Appl. No.: 13/381,329

(22) PCT Filed: Jun. 1, 2011

(86) PCT No.: PCT/US2011/038787
§ 371 (c)(1),
(2), (4) Date: Dec. 28, 2011

(87) PCT Pub. No.: WO2012/166135
PCT Pub. Date: Dec. 6, 2012

(65) Prior Publication Data
US 2012/0307075 A1 Dec. 6, 2012

(51) Int. Cl.
*G06T 1/00* (2006.01)

(52) U.S. Cl.
CPC .................. *G06T 1/0007* (2013.01)

(58) Field of Classification Search
CPC ................................................. G06T 1/0007
USPC ......................................................... 348/180
See application file for complete search history.

(56) References Cited

U.S. PATENT DOCUMENTS

| 5,870,136 A | 2/1999 | Fuchs et al. |
| 6,754,370 B1 * | 6/2004 | Hall-Holt et al. ............. 382/106 |
| 2002/0084974 A1 | 7/2002 | Ohshima et al. |
| 2004/0037462 A1 * | 2/2004 | Lewis et al. ................... 382/181 |
| 2004/0131232 A1 | 7/2004 | Meisner et al. |
| 2005/0219552 A1 | 10/2005 | Ackerman et al. |
| 2010/0092079 A1 | 4/2010 | Aller |

OTHER PUBLICATIONS

International Preliminary Report on Patentability, PCT/US11/33162, issued Dec. 2, 2013.
Harmut Surmann, Kai Lingemann, Andreas Nuchter, Joachim Hertzberg, A 3D laser range finder for autonomous mobile robots, Proceedings of the 32nd ISR(International Symposium on Robotics), pp. 153-158, Apr. 19-21 2001, GMD—German National Research Center for Information Technology, AiS—Institute for Autonomous intelligent Systems, Sankt Augustin, Germany.
Qilong Zhang, Robert Pless, Extrinsic Calibration of a Camera and Laser Range Finder (improves camera calibration).

(Continued)

*Primary Examiner* — Rowina Cattungal
(74) *Attorney, Agent, or Firm* — Turk IP Law, LLC

(57) ABSTRACT

Technologies are generally described for projecting structured light patterns onto an Augmented Reality (AR) scene in order to track AR camera motion in AR systems. In some examples, structured light patterns may be projected onto the AR scene from a light source in the same plane as the AR camera in order to preserve a consistent reference point for detecting the structured light pattern. The AR camera may detect the structured light patterns and determine the location of the AR camera based on a distance analysis of the detected structured light patterns. Based on the changing locations of the AR camera, the system may track the movement of the AR camera as its location relative to the AR scene changes.

22 Claims, 9 Drawing Sheets

(56) References Cited

OTHER PUBLICATIONS

R. Orghidan, E.M. Mouaddib, J. Salvi, J.J. Serrano, Catadioptric single-shot rangefinder for textured map building in robot navigation, The Institution of Engineering and Technology 2007, IET Comput. Vis., 2007, 1, (2), pp. 43-53.

International Search Report and Written Opinion PCT/US11/38787 mailed Sep. 14, 2011.

Livingston, "Vision-based Tracking with Dynamic Structured Light for Video See-through Augmented Reality", A Dissertation submitted to the facility of the University of North Carolina at Chapel Hill in partial fulfillment of the requirements for the degree of Doctor of Philosphy in the Department of Computer Science, Chapel Hill, 1998, Abstract and pp. 41-48.

Klein, "Visual Tracking for Augmented Reality", A thesis submitted for the degree of Doctor of Philosophy, University of Cambridge Department of Engineering, Jan. 2006, pp. 1-46.

International Preliminary Report on Patentability, PCT/US2011/038787, issued Dec. 2, 2013.

\* cited by examiner

STRUCTURED LIGHT PROJECTION FOR MOTION DETECTION IN AUGMENTED REALITY

CROSS-REFERENCE TO RELATED APPLICATIONS

This application is the National Stage filing under 35 U.S.C. §371 of PCT Application Ser. No. PCT/US11/38787 filed on Jun. 1, 2011. The disclosure of the PCT application is hereby incorporated by reference in its entirety.

BACKGROUND

Unless otherwise indicated herein, the materials described in this section are not prior art to the claims in this application and are not admitted to be prior art by inclusion in this section.

Augmented reality (AR) refers to a view of a physical (real) world environment whose elements are augmented by virtual, typically computer-generated, imagery, thereby creating a mixed reality. The augmentation may be conventionally in real time and in context with environmental elements, such a sporting event, a military exercise, a game, etc. AR technology enables the information about surrounding real world of a person to become interactive and digitally usable by adding object recognition and image generation. Artificial information about the environment and the objects may be stored and retrieved as an information layer separate from a real world view layer.

Tracking AR camera motion is a major component of AR, and image processing, markers, sensors, edge detection and object recognition are commonly used for tracking the AR camera motion. Using image processing places a computational load on the image processor and requires complicated interpretation and processing of the imaged scene. Additionally, markers and sensors add bulk and complexity to the AR camera and increase the cost of motion tracking. In some cases, image acquisition and processing may be replaced by three dimensional (3D) image sensors, which utilize structured light for 3D image construction and understanding, however these methods require significant processing power as well and complex and expensive laser projectors to cover the complete scene in the structured light. Further, structured light is typically produced by external independent light projectors, which may add to the computational burden in the 3D image construction, requiring extensive computing resources for AR camera motion tracking.

SUMMARY

The present disclosure generally describes techniques for tracking camera movement in AR systems employing structured light projections. According to some embodiments, an example method for tracking camera movement in Augmented Reality (AR) systems using structured light projections is provided. The example method may include projecting at least one structured light pattern from a structured light source onto a portion of an AR scene, detecting a reflected structured light pattern from one or more portions of the AR scene utilizing an image sensor in proximity of the AR image capture unit, and comparing the detected structured light pattern to a previously detected structured light pattern. The example method may also include determining a change in the AR image capture unit location based on the comparison and correlating the change in the AR image capture unit location with one or more captured images of the AR scene.

According to other embodiments, an example apparatus capable of tracking camera movement in Augmented Reality (AR) systems using structured light projections is provided. The example apparatus may include a memory adapted to store instructions, image data, and graph data. The example apparatus may also include a first processing unit adapted to execute a dynamic modeling module in conjunction with the instructions. The dynamic modeling module may project at least one structured light pattern from a structured light source onto a portion of an AR scene, where the at least one structured light pattern is configured to change in lateral dimensions as a function of distance from an AR camera, detect a reflected structured light pattern from one or more portions of the AR scene utilizing an image sensor in proximity of the AR camera, and compare the detected structured light pattern to a previously detected structured light pattern. According to other examples, the dynamic modeling module may also determine a change in the AR camera location based on the comparison and correlate the change in the AR camera location with one or more captured images of the AR scene.

According to further embodiments, a computer-readable storage medium may have instructions stored thereon for tracking camera movement in Augmented Reality (AR) systems using structured light projections. The instructions may include projecting at least one structured light pattern from a structured light source onto a portion of an AR scene, detecting a reflected structured light pattern from one or more portions of the AR scene utilizing an image sensor in proximity of the AR image capture unit, performing a distance analysis on the at least one structured light pattern to determine the distance between the AR image capture unit and the one or more portions of the AR scene, determining a change in the AR image capture unit location based on the distance analysis of the detected structured light pattern, and correlating the change in the AR image capture unit location with one or more captured images of the AR scene.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
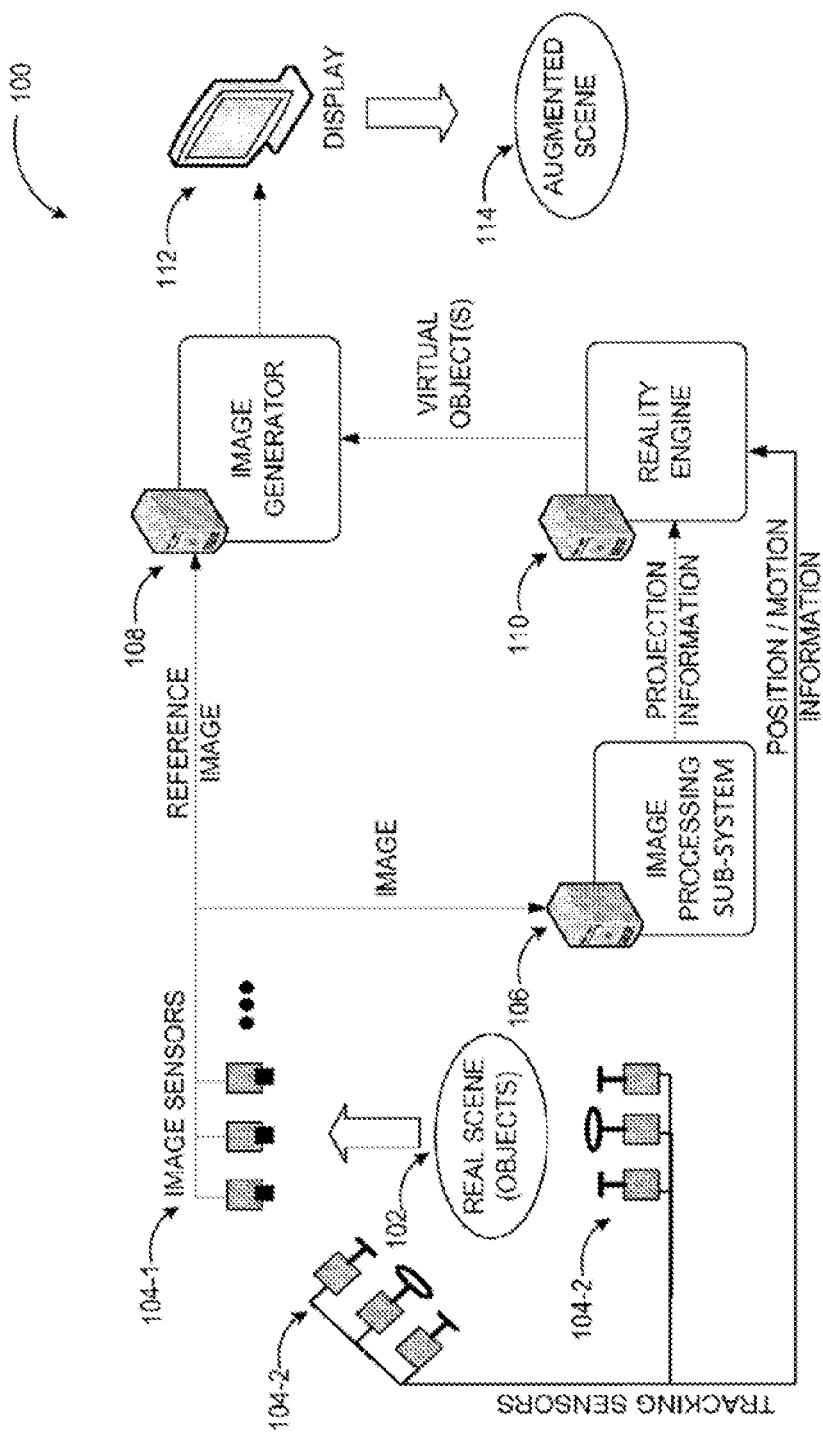
FIG. 1 illustrates an example Augmented Reality (AR) system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to projecting structured light patterns for motion detection in Augmented Reality.

Briefly stated, a structured light pattern may be projected onto an Augmented Reality (AR) scene in order to track AR camera motion in AR systems. Structured light patterns may be projected onto the AR scene from a light source in the same plane as the AR camera in order to preserve a consistent reference point for detecting the structured light pattern. The AR camera may detect the structured light patterns and determine the location of the AR camera based on a distance analysis of the detected structured light patterns. Based on the changing locations of the AR camera, the system may track the movement of the AR camera as its location relative to the AR scene changes.

FIG. 1 illustrates an example Augmented Reality (AR) system 100 arranged in accordance with at least some embodiments described herein. AR explores the application of computer-generated imagery in live video streams to expand the real world presentation. AR systems commonly include controlled environments containing a number of sensors and actuators, one or more computing device to process real and computer-generated imagery, and visualization systems such as head-mounted displays, virtual retinal displays, monitor or similar regular displays, and comparable devices.

The AR system 100 includes sensors 104 configured to capture live images of real scene (objects) 102. The sensors 104 may be digital cameras, webcams, and/or similar image capturing devices that may provide either analog or digital images as captured images. The captured image(s) may be provided by the sensors 104 to an image processing subsystem 106, which may be adapted to perform digitization of analog images into digital images, receive digital images, and/or process digital images. Processing provided by the image processing sub-system 106 may include determining locations of feature points in the images, computation of affine projections, tracking of edges, filtering, and/or similar operations. The image processing sub-system 106 may also be configured to provide projection information such as results of the above described operations to a reality engine 110. The reality engine 110 may be adapted to execute a graphics process to render scenes based on the captured images. Virtual objects may be rendered by the reality engine 110, which may be arranged to employ dynamic modeling and graph matching as discussed in more detail below.

An image generator 108 may be adapted to receive reference image(s) from the sensors 104, receive virtual object(s) from the reality engine 110, and overlay the captured real scene images with the virtual object(s) to generate an augmented scene. In one example implementation, the merging of the virtual and real scene images may be performed through luminance keying, where the virtual image is the key input and the real scene image is the reference input. In that implementation, the real scene image may provide a background signal for the luminance key and also serve as a synchronization signal for the image generator. A display 112 is one example visualization mechanism that can be used to generate an augmented scene for viewing by a user. As discussed previously, other types of display devices may be used to provide visualization of an augmented scene 114 for a user.

The image processing sub-system 106, the reality engine 110, and the image generator 108 may be implemented as separate applications, an integrated application, a centralized service, or a distributed service on one more computing devices. The one or more computing devices may be either heterogeneous or homogeneous, and may be implemented as a general purpose computing device or a special purpose computing device that may be comprised as a standalone computer, a networked computer system, a general purpose processing unit (e.g., a micro-processor, a micro-controller, a digital signal processor or DSP, etc.), or a special purpose processing unit. If executed on different computing devices, various components of the AR system 100 may be configured to communicate with one another over one or more networks.

The network(s) may comprise any topology of servers, clients, switches, routers, modems, Internet service providers, and any appropriate communication media (e.g., wired or wireless communications). A system according to some embodiments may have a static or dynamic network topology. The network(s) may include a secure network such as an enterprise network (e.g., a LAN, WAN, or WLAN), an unsecure network such as a wireless open network (e.g., IEEE 802.11 wireless networks), or a world-wide network (e.g., the Internet). The network(s) may also comprise a plurality of distinct networks that are adapted to operate together. The network(s) are adapted to provide communication between the nodes described herein. By way of example, and not limitation, the network(s) may include wireless media such as acoustic, RF, infrared and other wireless media.

Figure 2:
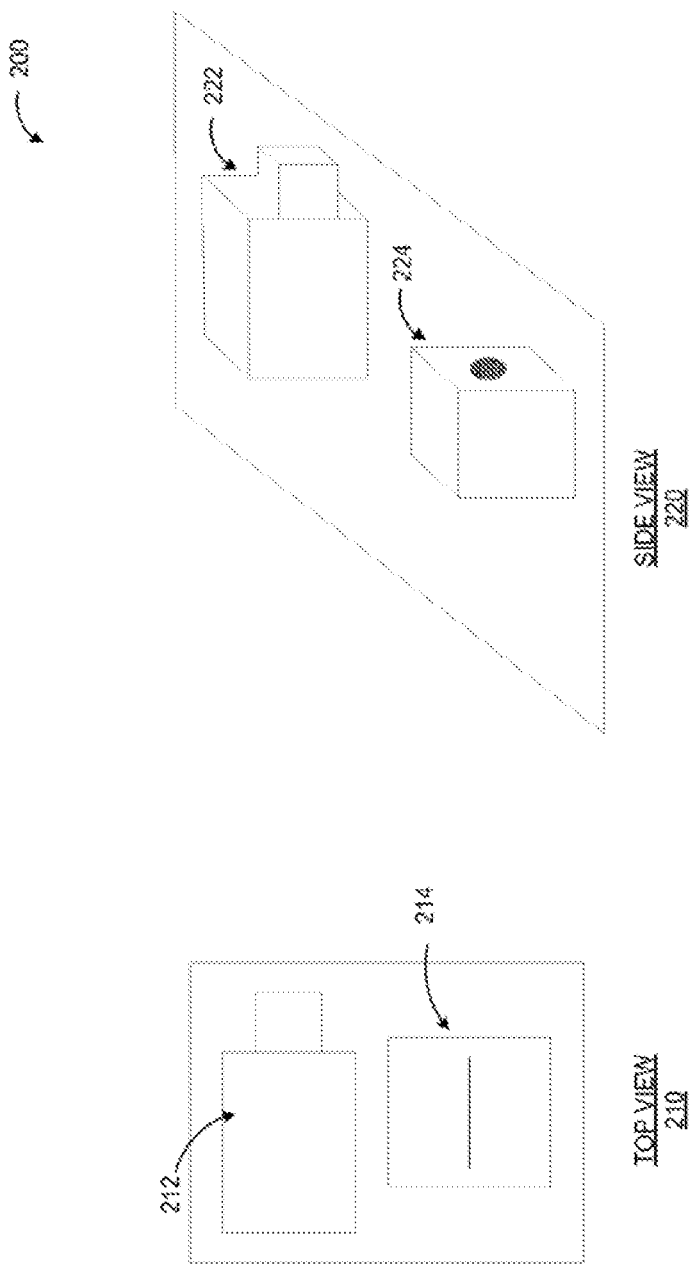
FIG. 2 illustrates an example configuration of an AR image capture unit and a light source situated in the same horizontal and vertical planes.

FIG. 2 illustrates an example configuration of an AR image capture unit and a light source situated in the same horizontal and vertical planes arranged in accordance with at least some embodiments described herein. Tracking of camera motion is typically required for Augmented Reality systems, however conventional approaches for tracking camera motion typically require image processing of the camera picture, markers placed in the imaged scene, sensors for providing information on the position for motion of the camera, and in some cases require 3D image sensors which may use structured light for image acquisition. In conventional methods, a structured light pattern may be generated from a separate light source unit that is fixed in the imaged scene as independent from the camera. The present disclosure identifies and appreciates that while these conventional systems may be effective for tracking camera motion in AR systems, the image processing can be computationally burdensome on the image processor and the sensors can add bulky dimensions to the camera unit and additional complexity for interpreting position and motion results. Further the 3D image reconstruction requires significant processing power as well as complex and expensive laser projectors in order to project structured light patterns over an entire AR scene for image acquisition, and additionally may require setup of an external independent light source for projecting the structured light on to the AR scene.

A system for projecting a structured light pattern on an AR scene for motion detection in AR systems according to at least some embodiments of the present disclosure may take advantage of projecting multiple structured light patterns on small fractions of an AR scene. The system may not attempt to reconstruct an entire AR scene, but instead may project structured light patterns on portions or small fractions of the imaged scene for obtaining small samples of the scene, using the localized structured light as markers for portions of the AR scene. Since the structured light patterns are projected on only small portions of the AR scene, the system may require less complex and less powerful light sources for producing the structured light.

In a system according to some embodiments, in order to track the motion of the camera, the system may detect the multiple structured light patterns in the scene, and perform straightforward calculations and analyses to determine the position of the camera relative to the structured light pattern on a portion of the AR scene. Calculations and analyses may include performing a distance analysis on the structured light pattern for determining the position of the structured light pattern as a function of its distance from the light source. A distance or sizes of the features may be designed to change in the lateral dimensions as a function of the distance. For example, an array of dots may be used where the distance between the dots is related to the distance from the pointer to the structure. Hence, the distance analysis may include depth extraction from structured light with minimal computational resource usage. The system may track small changes in the position of the structured light patterns on the small portions of the AR scene and correlate the change in position of the structured light pattern with a change in position of the camera. The correlation of the movement from the several projected structured light patterns is used to continuously extract camera motion information. Tracking only small changes of the structured light patterns and camera position, as opposed to attempting to image and reconstruct the entire 3D AR scene, requires simple and straightforward calculations, reducing the processing and computational power required by the image processor.

Returning to FIG. 2, a diagram 200 shows an example configuration of an AR image capture unit and a light source situated in the same horizontal and vertical planes in accordance with at least some embodiments described herein. In order to project a structured light pattern onto an AR scene, a light source 214 (also 224) configured to produce the structured light pattern may be set up within the AR scene. In a system according to some embodiments, the light source 214 may be located adjacent to an AR image capture unit 212 (also 222), such that the structured light pattern is projected from same vertical 210 and horizontal 220 planes. When the light source 214 and the AR image capture unit 212 are fixated in the same vertical 210 and horizontal 220 planes, a consistent reference point for the origination of the structured light pattern may be preserved, such that the structured light pattern detected in the AR scene may appear in constant locations in image sensors incorporated with the AR image capture unit 212. Since the origination point of the structured light pattern is the same relative to the image sensors of the AR image capture unit 212, the system may simply measure the changes in the structured light pattern as the AR image capture unit 212 and the light source 214 move together as a unit throughout the AR scene.

Based on the measured changes of the structured light pattern, the system may then correlate movement of the AR image capture unit 212 within the AR scene. Additionally, because the location of the light source 214 within the scene is not fixed and absolute, no prior set up of the light source may be required and additional computations for determining the location of the AR image capture unit relative to the light source and to the structured light pattern may be required. The AR image capture unit 212 may be, for example, an AR camera, and it may be configured to include one or more image sensors for detecting the AR scene and the reflected structured light patterns from the AR scene. The light source 214 for projecting a structured light pattern may be a laser emitting light source, and the AR camera, image sensors and the laser emitting light source may be integrated as a portable AR camera unit.

Figure 3:
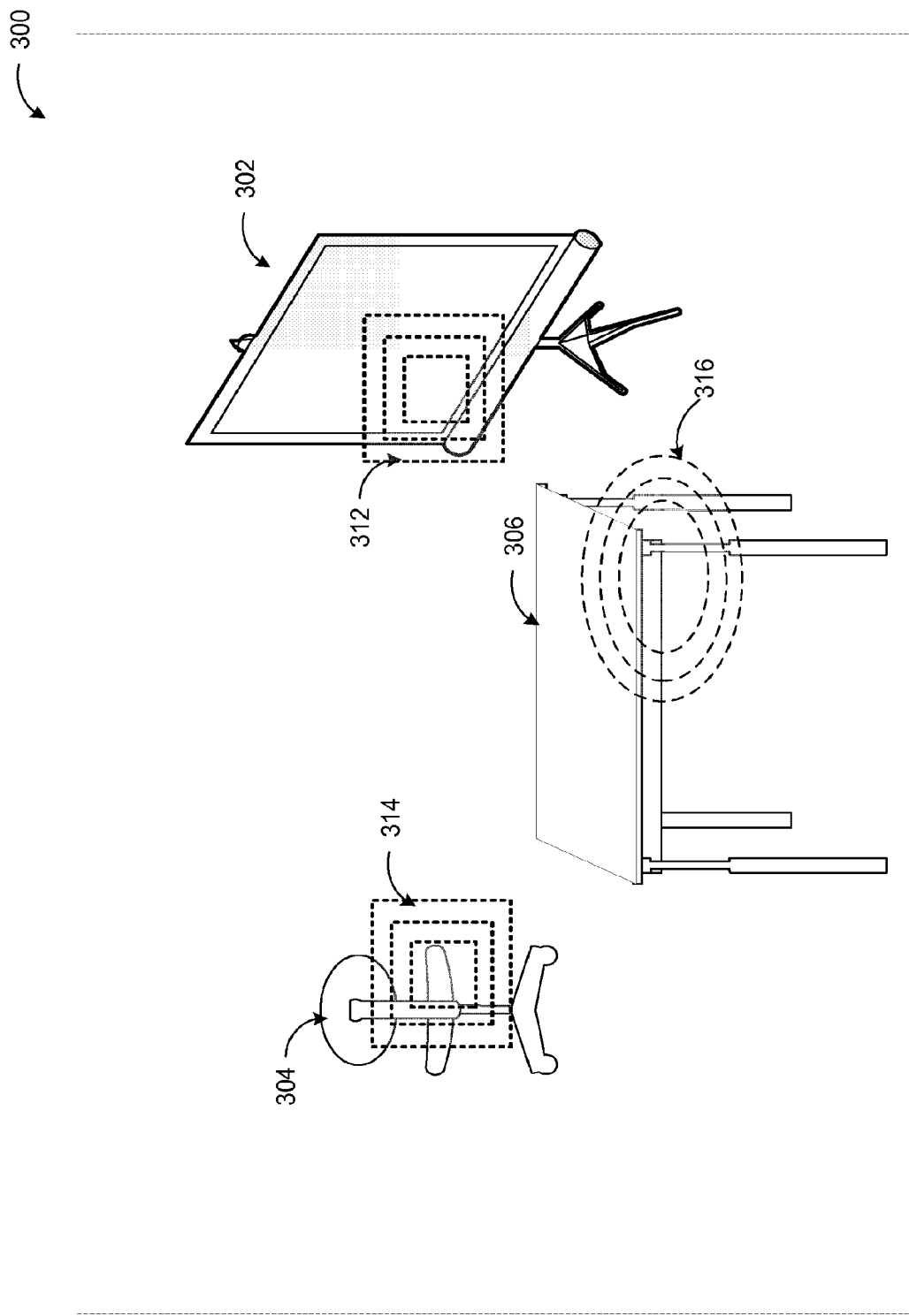
FIG. 3 illustrates an example configuration of structured light patterns projected onto portions of an AR scene.

FIG. 3 illustrates an example configuration of structured light patterns projected onto portions of an AR scene arranged in accordance with at least some embodiments described herein. As shown in a diagram 300, a system for projecting a structured light pattern on an AR scene for motion detection in AR systems according to at least some embodiments of the present disclosure may take advantage of projecting multiple structured light patterns on small fractions of an AR scene, using the localized structured light as markers of portions of the AR scene. Using structured light patterns 312, 314, and 316, the system may be able to determine the location of 3D objects 302, 304, 306 in the AR scene relative to the location of the AR image capture unit. As described above in conjunction with FIG. 2, the AR image capture unit 212 and the light source 214 may be fixated in the same plane, such that the structured light pattern may originate from the same reference point relative to the AR image capture unit 212. Thus, the AR image capture unit 212 may be configured to detect the structured light patterns on one or more 3D objects or portions of the AR scene and determine the location of the AR image capture unit within the scene. As the AR image capture unit moves and changes its location, the structured light patterns 312, 314, and 316 may be configured to modify their shape and size, indicating movement of the light source and the AR image capture unit. The system may detect the change in the structured light pattern and correlate movement of the camera with the measured changes in the structured light pattern.

In a system according to some embodiments, the structured light patterns, 312, 314, and 316 may be configured to change shape and size features in lateral dimensions as a function of the distance between the projection of the structured light patterns on the AR scene and the origination point of the structured light patterns, e.g. the light source and AR image capture unit. As an example, the light source may be a laser emitting light source, and the laser may be configured to produce an array of dots, such that when projected onto the scene, the size of each dot and the distance between the dots indicate an expected distance between the AR image capture unit and the portion of the AR scene on which the structured light pattern is projected. Additionally, the shape of the structured light patterns 312, 314 and 316 may vary according to the type of laser and pattern used, and may include shapes such as square, rectangular, circular, elliptical, triangular, and/or trapezoidal. The structured light patterns 312, 314 and 316 may include multiple rows or layers of shapes for increasing the surface area of the portion of the AR scene in which the structured light is projected on, such that more of a 3D object within the AR scene may be detected.

In an example embodiment, the light source may project the one or more structured light patterns 312, 314 and 316 onto one or more portions of the AR scene for obtaining multiple samples of the AR scene. By using several projected structured light patterns 312, 314 and 316, more samples of the scene can be detected by the AR image capture device, and more accurate measurements of location and motion may be determined. Additionally, utilizing the structured light patterns 312, 314 and 316 may enhance the ability to determine the motion of the AR image capture unit in the event that a 3D object in the AR scene may be dynamic itself. By detecting the multiple structured light patterns 312, 314 and 316 within the AR scene, the AR image capture unit may be able to recognize and distinguish that a 3D object within the AR scene has moved when one of the structured light patterns moves or changes and the remaining sampled structured light patterns 312, 314 and 316 remain stationary. This may remove the chance that a moving 3D object within the AR scene may be confused with actual movement of the AR image capture unit, and refine the ability of the AR image capture unit to track its own movement within the AR scene.

In a further example, the light source may project the structured light patterns 312, 314 and 316 onto portions of the AR scene in pulses synchronized with an image capture of the AR image capture unit in order to reduce the blur that can be associated with motion. For example, the AR image capture unit may be an AR camera, such that an image capture is coordinated with the opening and closing of the AR camera shutter. The light source may be configured to project the structured light patterns 312, 314 and 316 onto portions of the AR scene in pulses synchronized with the opening and closing of the AR camera shutter during image capture. Additionally, a pulsed light source such as a pulsed laser may provide a pulse that is shorter than the open shutter duration, which may be used to reduce motion blurring.

Figure 4:
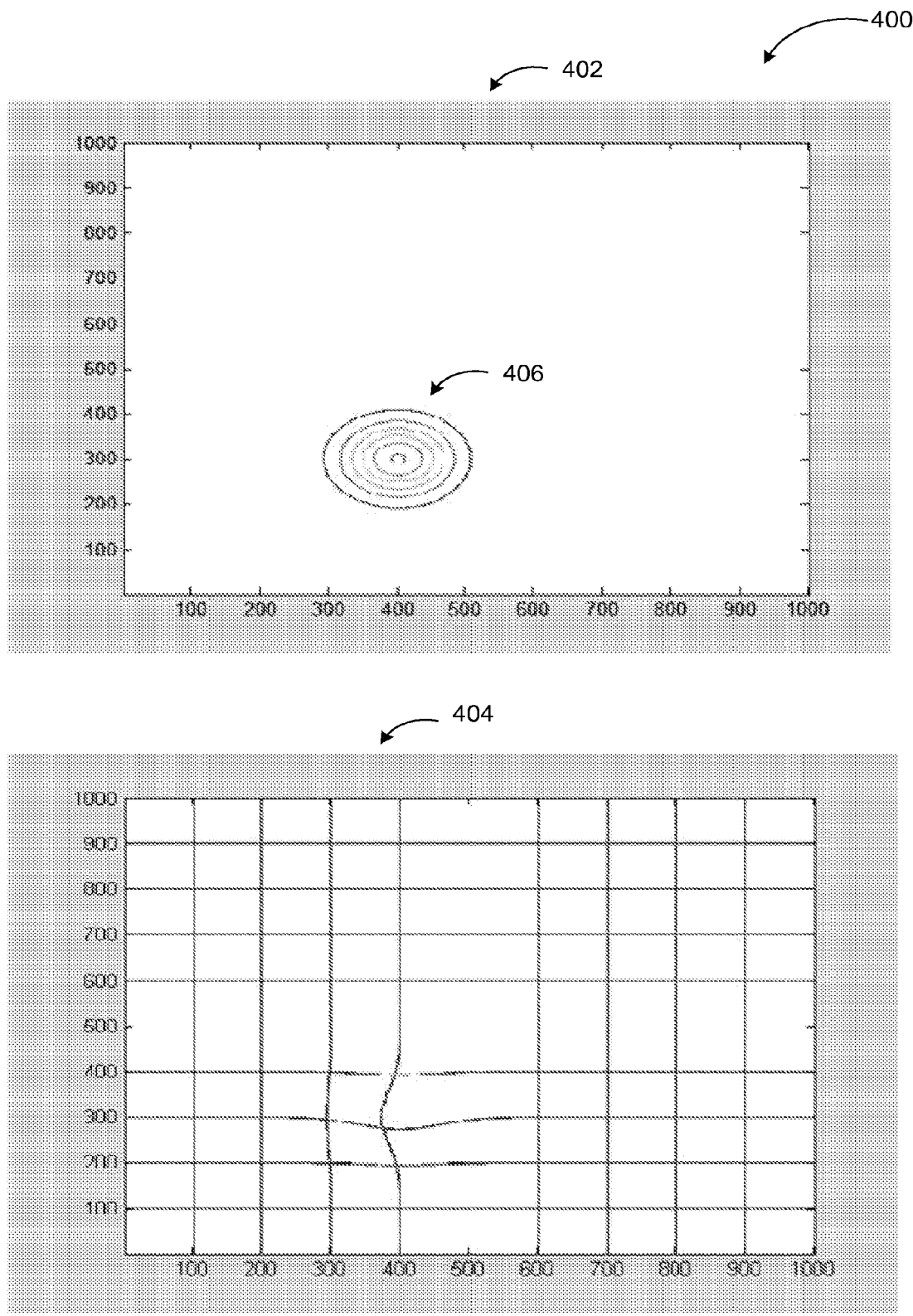
FIG. 4 illustrates how a projected structured light pattern may indicate the location and contour of a 3D object in an AR scene.

FIG. 4 illustrates how a projected structured light pattern may indicate the location and contour of a 3D object in an AR scene arranged in accordance with at least some embodiments described herein. As described above in conjunction with FIG. 3, a structured light pattern may be configured to change its shape and size features as a function of its distance from the light source origination point. Thus, when projected onto a 3D object within a scene, the size and shape of the lateral features of the structured light pattern may indicate the location of the 3D object within the scene and the shape, size and contour of a 3D object 406. As demonstrated in a diagram 400, the 3D object in the AR scene may have a shape, size, location and contour as indicated in a contour map 402, where the 3D object is centered at a particular location on the contour map 402, and the contour rings around the center indicate varying distances of the contour of the 3D object from the center point.

In an example embodiment, a structured light pattern 404 may be projected on the 3D object, and the resulting structure of the structured light pattern 404 may reveal the shape and contour of the 3D object 406 in the AR scene. For example, portions of the 3D object 406 that are further away from the light source may produce a structured light pattern where the dots or rows of the pattern are further apart or the size of the dots or other shape are larger compared to the dots of a reflected pattern from an object that is nearer to the light source, indicating a larger distance from the light source. Additionally, portions of the 3D object 406 that are closer to the light source may produce smaller dots and rows of the structured light pattern to indicate that a particular portion is closer in distance to the light source.

In an example embodiment, the system may be configured to perform a distance analysis on the structured light pattern 404 in order to determine the distance of the AR image capture unit from the one or more 3D objects or portions of the AR scene where the one or more structured light patterns are projected. The light source may produce the structured light pattern 404 that is configured to produce an expected shape based on an expected distance between the AR image capture unit and the one or more portions of the AR scene. Based on the expected distance and shape of the structured light patterns, a distance analysis of the resulting altered structured light pattern on one or more portions of the AR scene may be performed to reveal the actual distance of the AR image capture unit and light source from the one or more portions of the AR scene. Thus in one frame, the current location of the AR image capture unit may be determined based on the distance analysis of the currently detected structured light pattern 404.

Figure 5:
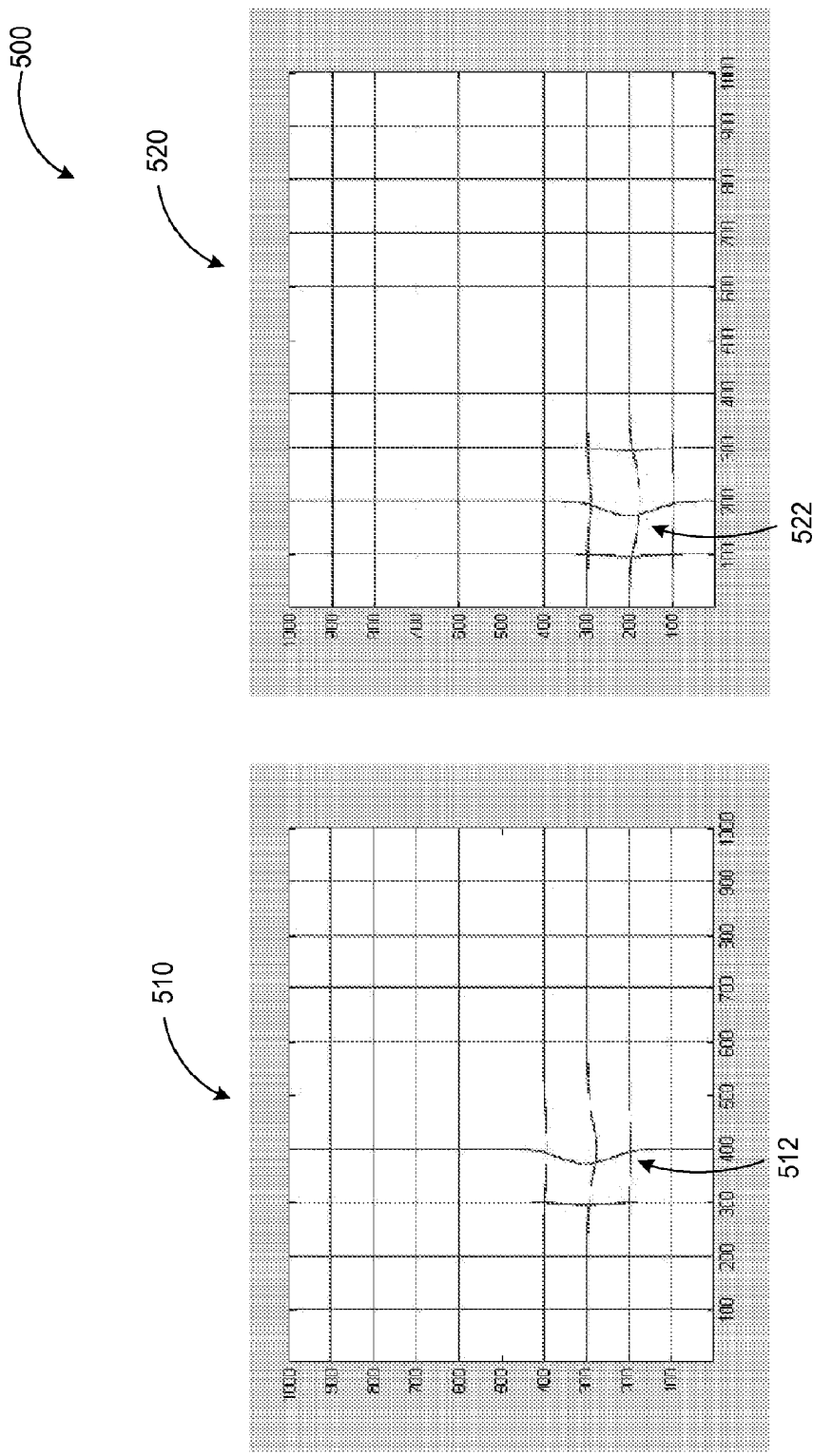
FIG. 5 illustrates how a change in a structured light pattern may represent a change in the location of the AR image capture unit.

FIG. 5 illustrates how a change in a structured light pattern may represent a change in the location of the AR image capture unit arranged in accordance with at least some embodiments described herein. As described above in conjunction with FIG. 4, a current location of the AR image capture unit may be determined based on the distance analysis of the currently detected structured light pattern 404. In order to track the movement of the AR image capture unit within an AR scene, multiple subsequent and continuous structured light patterns may be detected and compared, indicating a change in the location of the captured image in the AR scene, and thus revealing a dynamic motion of the AR image capture unit. As the location of the captured image of the structured light pattern on a 3D object in the AR scene changes relative to the AR image capture unit, the change in the structured light pattern on a 3D object may be correlated with actual AR image capture unit movement.

In an example embodiment, a motion of the AR image capture unit may result in a change in the location of the 3D object in the structured light pattern. For example, as demonstrated in a diagram 500, the system may initially detect a structured light pattern 510 on the AR scene, and the configuration of the structured light pattern 510 may indicate the location, shape, size and contour of a 3D object 512 in the AR scene. Based on the configuration of the structured light pattern 510, the system may perform a distance analysis on the structured light pattern 510 to determine the current location of the AR image capture unit relative to its distance from the 3D object 512 in the AR scene. As the AR image capture unit and the attached light source move in three dimensional directions within the AR scene, the location of the 3D object in the original structured light pattern 510 may change, and a resulting structured light pattern 520 may indicate the new location, shape, size and contour of a 3D object 522 in the AR scene. The resulting structured light pattern 520 may then be detected by the image sensors of the AR image capture unit, and a subsequent distance analysis may be performed on the resulting structured light pattern 520 to determine the location of the AR image capture unit relative to its distance from the new location of the 3D object 522 in the AR scene.

The distance analysis of the resulting structured light pattern 520 may be compared to the distance analysis of the previously detected structured light pattern 510. Based on the comparison of the distance analysis of the resulting structured light pattern 520 and the previously detected structured light pattern 510, the current AR image capture unit location may be compared to the previous AR image capture unit location, and the relative change in AR image capture unit location may be determined. In some embodiments, the system may continuously detect structured light patterns as the location of the 3D objects in the structured light patterns change, perform distance analyses on the currently detected structured light patterns, compare the current distance analyses to a previous distance analysis of a detected structured light pattern, and determine changes in the location of the AR image capture unit, thus providing constant and seamless AR image capture unit location determination and motion tracking as the AR image capture unit moves within the AR scene.

Figure 6:
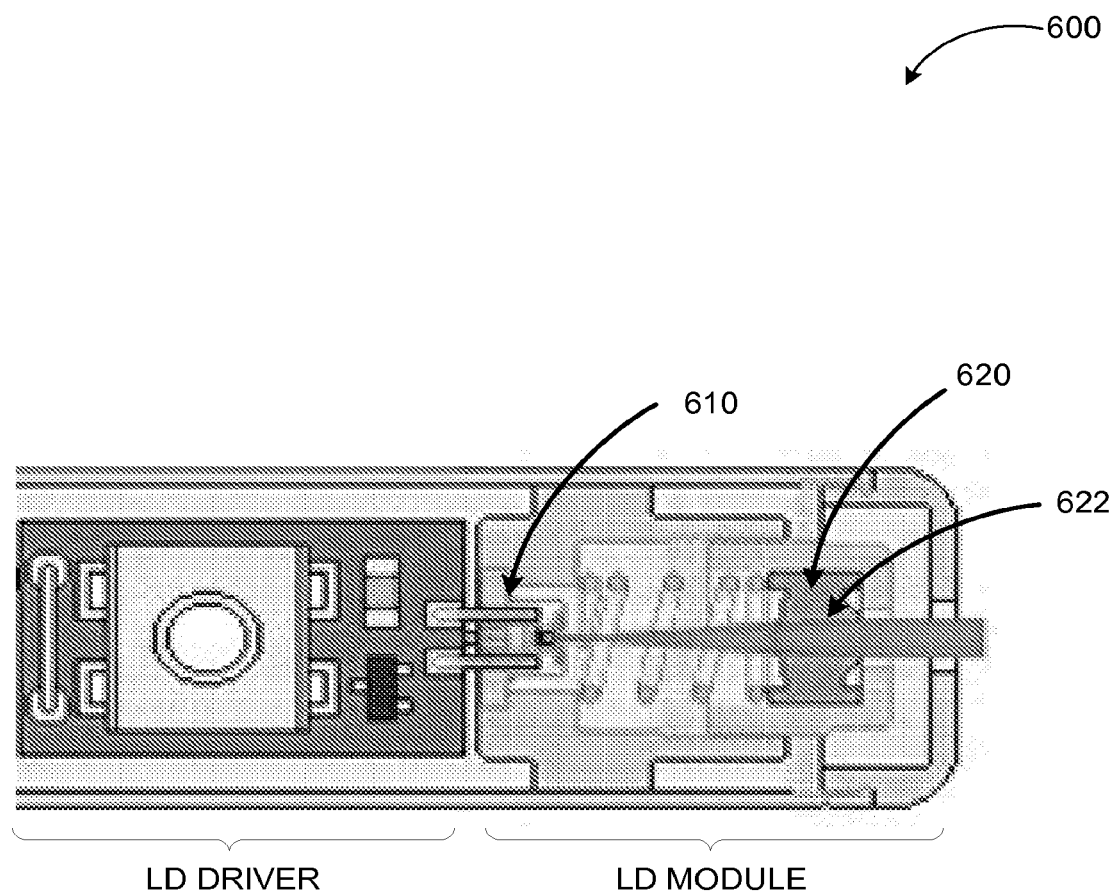
FIG. 6 illustrates an example laser emitting light source.

FIG. 6 illustrates an example laser emitting light source arranged in accordance with at least some embodiments described herein. In a system according to some embodiments, one or more structured light patterns may be projected from a light source onto portions of an AR scene for providing multiple samples of the AR scene for accurately determining the location of the AR camera relative to 3D objects within the AR scene. The structured light pattern may be projected from a light source, which may be fixed in the same horizontal and vertical planes as an AR image capture unit. The AR image capture unit may be an AR camera, and may include image sensors for detecting the reflected structured light patterns from the portions of the AR scene. The AR camera, image sensors and the light source, may be integrated together as a stand-alone, portable unit, such that the location of the light source is fixed relative to the image sensors of the AR camera, and the unit may move together throughout the scene. By keeping the light source and the AR camera in the same planes, a consistent reference point may be used for the light source origination point for detection the structured light pattern on the AR scene.

In an example embodiment, the light source may be a laser emitting light source 600, which may be configured to produce a laser light 610 in a structured light pattern configured to change its shape and size features in lateral dimensions as a function of a distance between the one or more portions of the AR scene and the AR camera. The laser emitting light source 600 may be encased in a transistor outline can (TO can) package including a vertical cavity surface emitting laser (VCSEL) or a vertical external cavity surface emitting laser (VECSEL). In an example configuration, the laser emitting light source 600 may collimate the structured light through a collimating lens 620 and additionally may incorporate a diffractive optical pattern 622 in conjunction with the collimating lens for producing the structured light pattern.

The laser emitting light source 600 may be configured to produce a laser light 610 having a wavelength greater than about 800 nanometers and less than about 1000 nanometers, such that the laser light 610 may be transparent or invisible to the human eye, but visible and detectable by the image sensors incorporated with the AR camera. Additionally, in order to minimize blur associated with the motion of the AR camera, the laser emitting light source 600, may synchronize the projection of the structured light pattern with an opening of a shutter of the AR camera during image capture.

While embodiments have been discussed above using specific examples, components, and configurations, they are intended to provide a general guideline to be used for projecting a structured light pattern on an AR scene for motion detection in AR systems. These examples do not constitute a limitation on the embodiments, which may be implemented using other components, modules, and configurations using the principles described herein. For example, any suitable light source may be used for projecting a structured light pattern onto an AR scene and any structured light pattern may be used identifying the location, shape and size of an object in the AR scene. Furthermore, actions discussed above may be performed in various orders, especially in an interlaced fashion.

Figure 7:
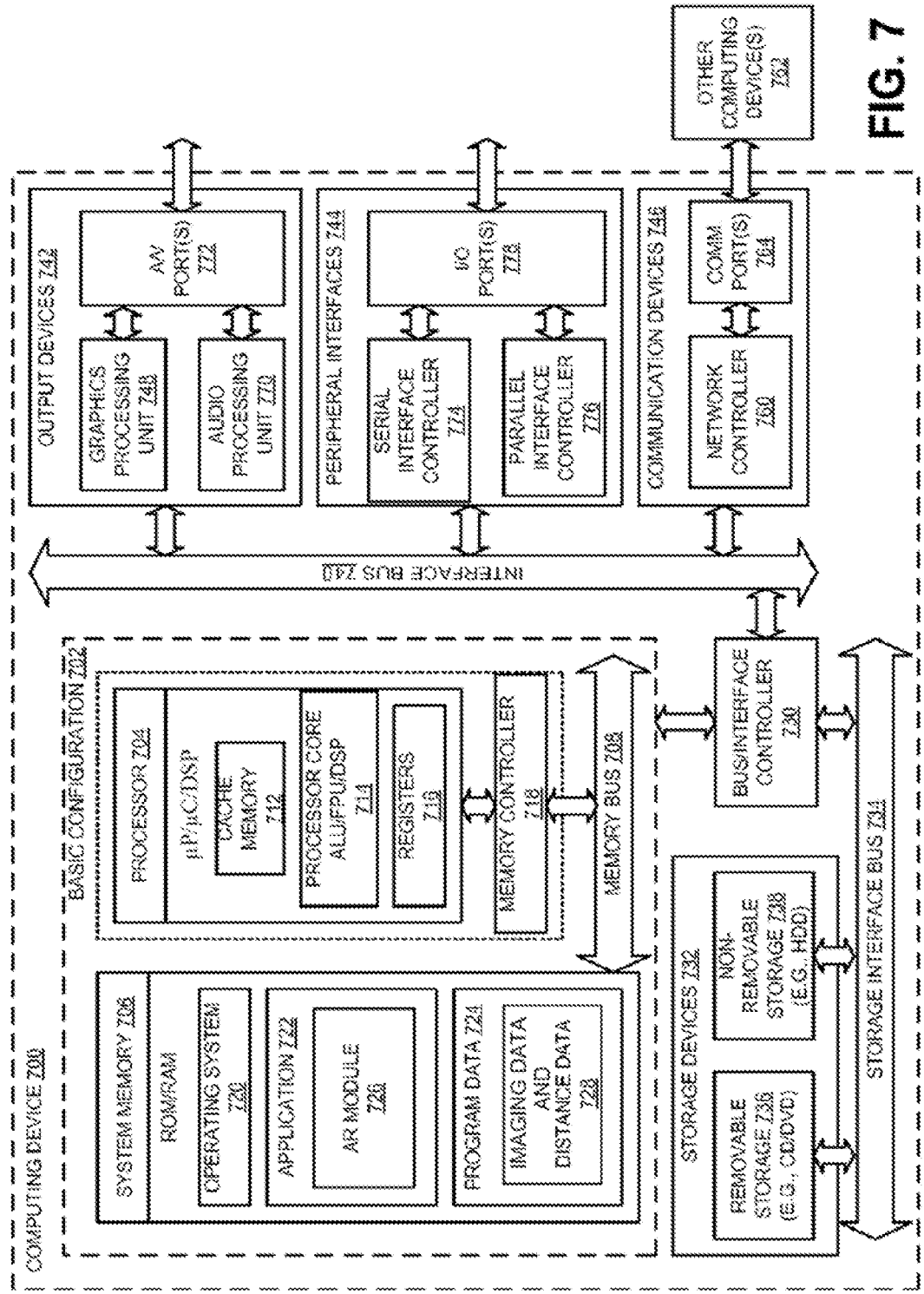
FIG. 7 illustrates a general purpose computing device, which may be used to implement projecting structured light patterns for motion detection in AR systems.

FIG. 7 illustrates a general purpose computing device, which may be used to implement projecting structured light patterns for motion detection in AR systems arranged in accordance with at least some embodiments described herein. In a very basic configuration 702, a computing device 700 typically includes one or more processors 704 and a system memory 706. A memory bus 708 may be used for communicating between the processor 704 and the system memory 706.

Depending on the desired configuration, the processor 704 may be of any type including but not limited to a microprocessor (µP), a microcontroller (µC), a digital signal processor (DSP), or any combination thereof. The processor 704 may include one more levels of caching, such as a cache memory 712, a processor core 714, and registers 716. The example processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, one or more applications 722, and program data 724. The application 722 may include an AR module 726 that is arranged to adjust operational parameters of a motion tracking system using structured light patterns and distance analysis as discussed above. The program data 724 may include one or more of imaging data and distance data 728, and similar data as discussed above in conjunction with FIG. 4 and FIG. 5. This data may be useful in performing distance analysis on the structured light patterns for determining the distance of the AR image capture unit from an object in the AR scene and determining the location of the AR image capture unit based on the measured distances. In some embodiments, the application 722 may be arranged to operate with the program data 724 on the operating system 720 such that three dimensional objects are recognized and virtual representations generated as described herein. This described the basic configuration 702 is illustrated in FIG. 7 by those components within the inner dashed line.

The computing device 700 may have additional features or functionality, and additional interfaces to facilitate communications between the basic configuration 702 and any required devices and interfaces. For example, a bus/interface controller 730 may be used to facilitate communications between the basic configuration 702 and one or more data storage devices 732 via a storage interface bus 734. The data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., output devices 742, peripheral interfaces 744, and communication devices 746) to the basic configuration 702 via bus/interface controller 730. Some example output devices 742 include a graphics processing unit 748 and an audio processing unit 770, which may be configured to communicate to various external devices such as a display or speakers via one or more A/V ports 772. Example peripheral interfaces 744 include a serial interface controller 774 or a parallel interface controller 776, which may be configured to communicate with external devices such as input devices (e.g., keyboard, mouse, pen, voice input device, touch input device, etc.) or other peripheral devices (e.g., printer, scanner, etc.) via one or more I/O ports 778. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations. Moreover computing device 700 may be implemented as a networked system or as part of a general purpose or specialized server.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 8:
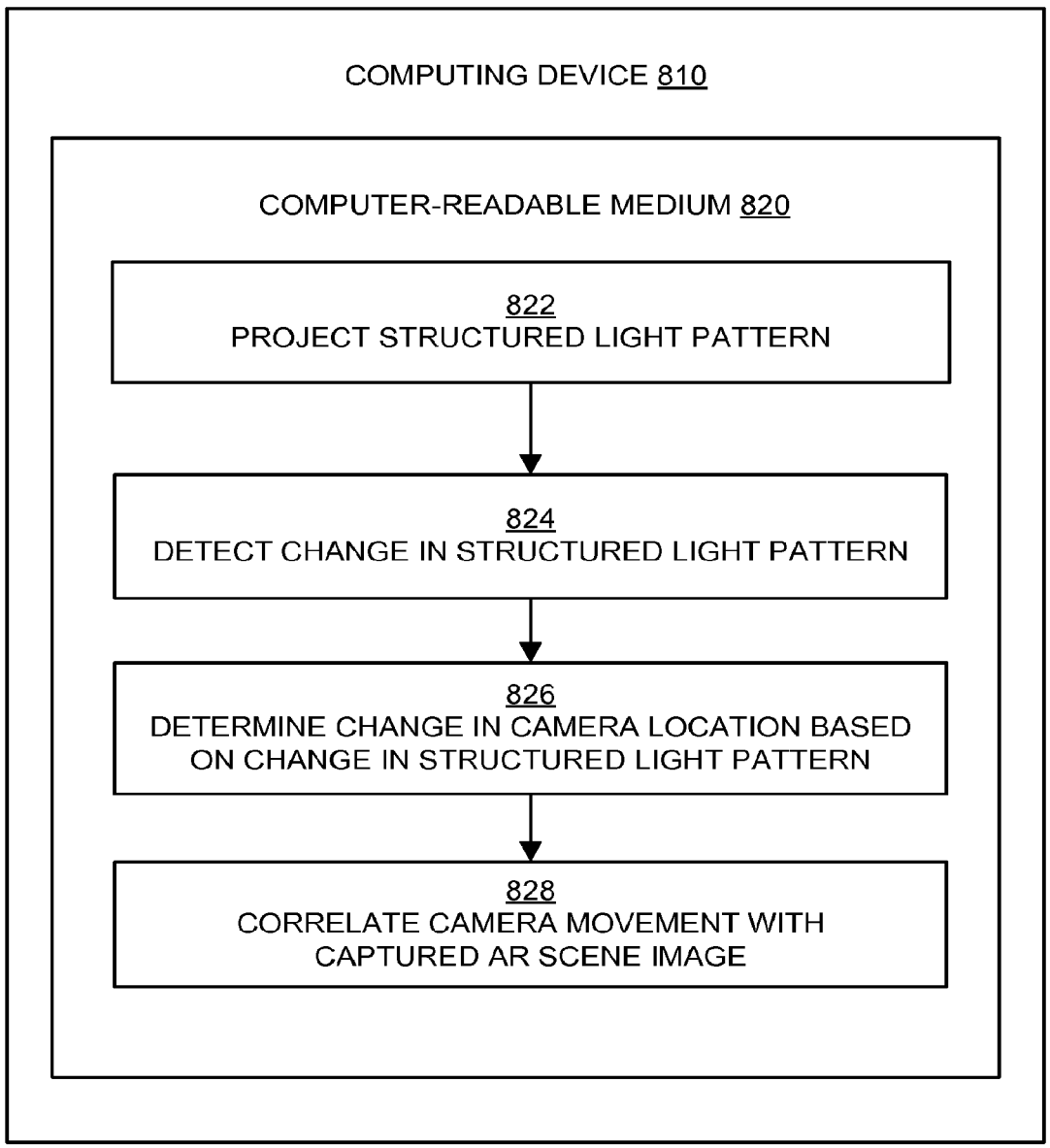
FIG. 8 is a flow diagram illustrating an example method that may be performed by a computing device such as device 700 in FIG. 7.

FIG. 8 is a flow diagram illustrating an example method that may be performed by a computing device, such as the computing device 700 in FIG. 7, arranged in accordance with at least some embodiments described herein. Example methods may include one or more operations, functions or actions as illustrated by one or more of blocks 822, 824, 826, and/or 828. The operations described in the blocks 822 through 828 may also be stored as computer-executable instructions in a computer-readable medium such as computer-readable medium 820 of computing device 810.

A process of projecting a structured light pattern for motion detection in AR systems may begin with block 822, "PROJECT STRUCTURED LIGHT PATTERN". At block 822, a structured light pattern may be projected onto one or more portions of an AR scene from a light source. The light source may be situated in the same horizontal and vertical plane as an AR image capture unit in order to preserve a consistent reference point for the origination of the structured light pattern. The structured light pattern may be configured to change in lateral dimensions as a function of the distance from the AR image capture unit and the light source.

Block 822 may be followed by block 824, "DETECT CHANGE IN STRUCTURED LIGHT PATTERN." At block 824, an image sensor in the proximity of the AR image capture unity may detect a reflected structured light pattern from one or more portions of the AR scene. The structured light pattern may change in lateral dimensions when projected on a 3D object in the AR scene as a function of the distance from the AR image capture unit and the light source. Thus the structured light pattern may indicate the location, shape and contour of the 3D object in the AR scene, relative to its distance from the AR image capture unit and the light source. The currently detected structured light pattern may be compared to a previously detected structured light pattern in order to detect a change in the structured light pattern.

Block 824 may be followed by block 826, "DETERMINE CHANGE IN CAMERA LOCATION BASED ON CHANGE IN STRUCTURED LIGHT PATTERN." At block 826, a distance analysis may be performed on the structured light pattern to determine the distance between the AR image capture unit and the one or more portions of the AR scene where the one or more structured light patterns are projected. The current location of the AR image capture unit may be determined based on the distance analysis of the currently detected structured light pattern. The distance analysis of the currently detected structured light pattern may be compared to the distance analysis of the previously detected structured light pattern. Based on the comparison of the distance analysis of the currently detected structured light pattern and the previously detected structured light pattern, the current AR image capture unit location may be compared to the previous AR image capture unit location, and the change in AR image capture unit may be determined.

Block 826 may be followed by block 828, "CORRELATE CAMERA MOVEMENT WITH CAPTURED AR SCENE IMAGE." At block 828, AR image capture unit movement may be correlated with the detected change in structured light pattern on 3D objects in the AR scene. As the location of the captured image of the structured light pattern on a 3D object in the AR scene changes relative to the AR image capture unit, the change in the structured light pattern on a 3D object may be correlated with actual AR image capture unit movement.

Blocks 822 through 826 may be performed by a dynamic modeling module of a processor of a first computing device (e.g. the processor 704 or graphics processing unit 748 of a computing device 700). Blocks 828 through 834 may, on the other hand be performed by a graph matching module of the same processor or another processor on a second computing device coupled to the first computing device through a network. Of course, all blocks may be performed by a single module as well.

The blocks included in the above described process are for illustration purposes. Projecting a structured light pattern on an AR scene for motion detection in AR systems may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 9:
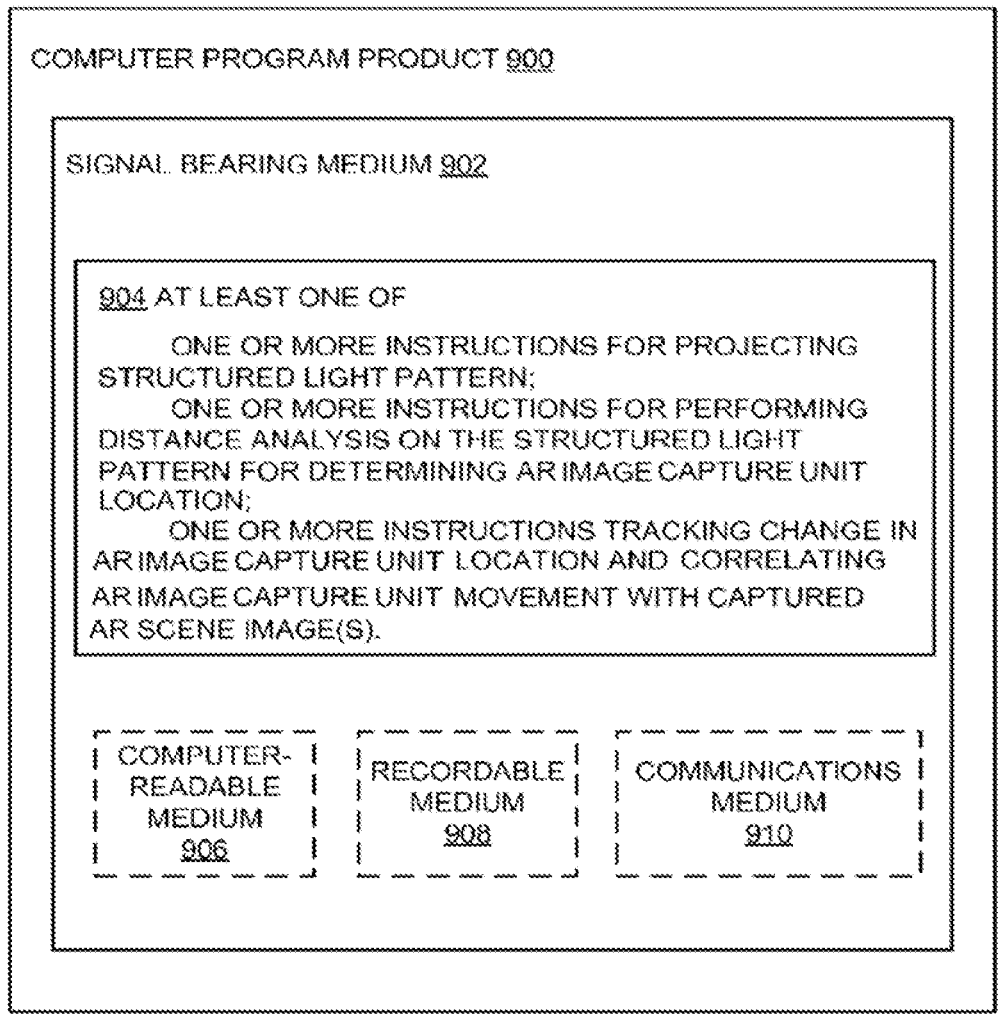
FIG. 9 illustrates a block diagram of an example computer program product, all arranged in accordance with at least some embodiments described herein.
Figure 3:
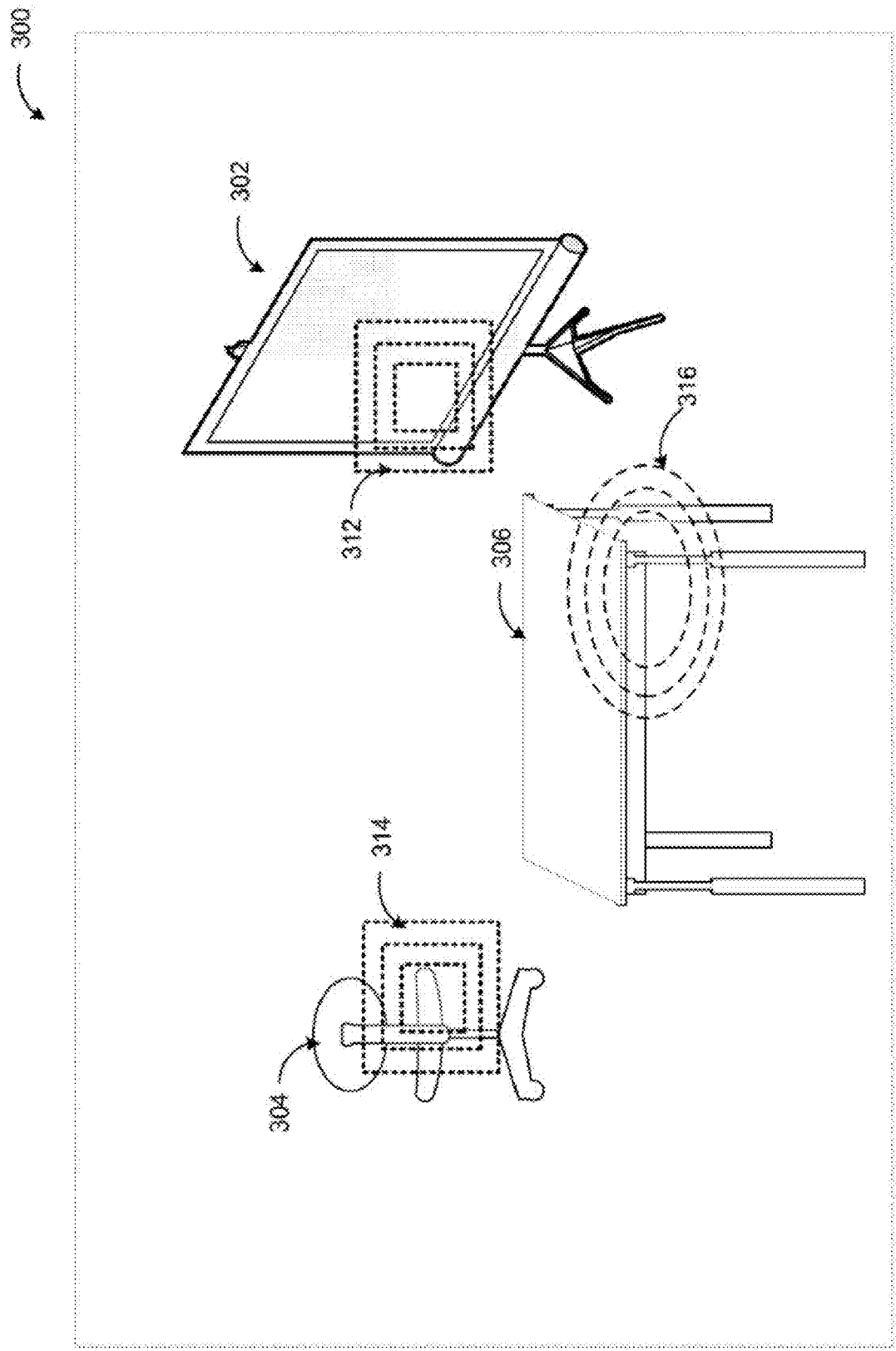

FIG. 9 illustrates a block diagram of an example computer program product 900 arranged in accordance with at least some embodiments described herein. In some examples, as shown in FIG. 9, the computer program product 900 may include a signal bearing medium 902 that may also include machine readable instructions 904 that, when executed by, for example, a processor, may provide the functionality described above with respect to FIG. 7 and FIG. 8. Thus, for example, referring to the processor 704, the AR module 726 may undertake one or more of the tasks shown in FIG. 9 in response to the instructions 904 conveyed to the processor 704 by the signal bearing medium 902 to perform actions associated with projecting a structured light pattern on an AR scene for motion detection in AR systems as described herein. Some of those instructions may include projecting a structured light pattern, performing distance analysis on the structured light pattern for determining AR image capture unit location, tracking changes in the AR image capture unit location and correlating AR image capture unit movement with the captured AR scene images.

In some implementations, the signal bearing medium 902 depicted in FIG. 9 may encompass a computer-readable medium 906, such as, but not limited to, a hard disk drive, a Compact Disc (CD), a Digital Versatile Disk (DVD), a digital tape, memory, etc. In some implementations, the signal bearing medium 902 may encompass a recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the computer program product 900 may be conveyed to one or more modules of the processor 704 by an RF signal bearing medium, where the signal bearing medium 902 is conveyed by the wireless communications medium 910 (e.g., a wireless communications medium conforming with the IEEE 802.11 standard).

The present disclosure describes a method for tracking camera movement in Augmented Reality (AR) systems using structured light projections. The method for tracking camera movement in Augmented Reality (AR) systems using structured light projections may include projecting at least one structured light pattern from a structured light source onto a portion of an AR scene, detecting a reflected structured light pattern from one or more portions of the AR scene utilizing an image sensor in proximity of the AR image capture unit, comparing the detected structured light pattern to a previously detected structured light pattern, determining a change in the AR image capture unit location based on the comparison, and correlating the change in the AR image capture unit location with one or more captured images of the AR scene.

According to some examples, performing method for tracking camera movement in Augmented Reality (AR) systems using structured light projections may include performing a distance analysis on the at least one structured light pattern to determine the distance between the AR image capture unit and the one or more portions of the AR scene, and determining the AR image capture unit location based on the distance analysis of the detected structured light pattern.

According to some examples, performing method for tracking camera movement in Augmented Reality (AR) systems using structured light projections may include continuously tracking AR image capture unit movement relative to the AR scene based on continuous determination of changes in the detected structured light pattern.

According to some examples, performing method for tracking camera movement in Augmented Reality (AR) systems using structured light projections may also include projecting the at least one structured light pattern from the structured light source onto a portion of the AR scene in pulses synchronized with an image capture of the AR image capture unit. The laser emitting light source may also be a pulsed laser emitting light source configured to provide a pulse that is shorter than an open period of a shutter of the AR camera.

According to some examples, performing method for tracking camera movement in Augmented Reality (AR) systems using structured light projections may further include projecting two or more structured light patterns on two or more portions of the AR scene for obtaining multiple samples of the AR scene.

According to some examples, the structured light source may be a laser emitting light source, the AR image capture unit may be a camera, and projection of the structured light pattern may be synchronized with an opening of a shutter of the AR camera.

According to some examples, the structured light pattern may be an array of dots, and a size of each dot and a distance between the dots may be determined based on an expected distance between the AR image capture unit and the one or more portions of the AR scene.

According to some examples, the structured light source, the image sensor, and the AR image capture unit may be integrated as a portable AR camera.

According to some examples, the structured light pattern may be projected in the same horizontal and vertical planes as the AR image capture unit.

According to some examples, performing method for tracking camera movement in Augmented Reality (AR) systems using structured light projections may further include collimating the structured light through a collimating lens, and applying a diffractive optical pattern after the collimating lens for producing the structured light pattern.

According to some examples, the structured light source may be encased in a transistor outline can (TO can) package including a vertical cavity surface emitting laser (VCSEL).

According to some examples, performing method for tracking camera movement in Augmented Reality (AR) systems using structured light projections may further include configuring the structured light source to produce a laser light having a wavelength greater than about 800 nanometers and less than about 1000 nanometers.

The present disclosure also describes an apparatus tracking camera movement in Augmented Reality (AR) systems using structured light projections. The apparatus tracking camera movement in Augmented Reality (AR) systems using structured light projections may include a memory adapted to store instructions, image data, and graph data; and a first processing unit adapted to execute a dynamic modeling module in conjunction with the instructions. The dynamic modeling module may be adapted to project at least one structured light pattern from a structured light source onto a portion of an AR scene, and the at least one structured light pattern may be configured to change in lateral dimensions as a function of distance from an AR camera. The dynamic modeling module may also be adapted to detect a reflected structured light pattern from one or more portions of the AR scene utilizing an image sensor in proximity of the AR camera, compare the detected structured light pattern to a previously detected structured light pattern, determine a change in the AR camera location based on the comparison, and correlate the change in the AR camera location with one or more captured images of the AR scene.

According to some examples, the first processing unit may be configured to change shape and size features of the at least one structured light pattern in lateral dimensions as a function of a distance between the one or more portions of the AR scene and the AR camera.

According to some examples of an apparatus tracking camera movement in Augmented Reality (AR) systems using structured light projections, the dynamic modeling module may be further adapted to perform a distance analysis on the at least one structured light pattern to determine the distance between the AR camera and the one or more portions of the AR scene, and determine the AR camera location based on the distance analysis of the detected structured light pattern.

According to further examples of an apparatus tracking camera movement in Augmented Reality (AR) systems using structured light projections, the dynamic modeling module may also be adapted to continuously track AR camera movement relative to the AR scene based on continuous determination of changes in the detected structured light pattern.

According to further examples of an apparatus tracking camera movement in Augmented Reality (AR) systems using structured light projections, the dynamic modeling module may also be adapted to project the at least one structured light pattern from the structured light source onto a portion of the AR scene in pulses synchronized with an image capture of the AR camera or to project the at least one structured light pattern from the structured light source onto a portion of the AR scene in pulses shorter than an image capture period of the AR camera.

According to further examples of an apparatus tracking camera movement in Augmented Reality (AR) systems using structured light projections, the structured light source may be a laser emitting light source and projection of the structured light pattern is synchronized with an opening of a shutter of the AR camera.

According to further examples of an apparatus tracking camera movement in Augmented Reality (AR) systems using structured light projections the structured light pattern may be an array of dots, and a size of each dot and a distance between the dots may be determined based on an expected distance between the AR camera and the one or more portions of the AR scene.

According to further examples of an apparatus tracking camera movement in Augmented Reality (AR) systems using structured light projections the structured light pattern may be projected in the same horizontal and vertical planes as the AR camera.

According to further examples of an apparatus tracking camera movement in Augmented Reality (AR) systems using structured light projections the dynamic modeling module may be further adapted to collimate the structured light through a collimating lens, and apply a diffractive optical pattern after the collimating lens for producing the structured light pattern.

According to further examples of an apparatus tracking camera movement in Augmented Reality (AR) systems using structured light projections the dynamic modeling module may be adapted to configure the structured light source to produce a laser light having a wavelength greater than about 800 nanometers and less than about 1000 nanometers.

According to further examples of an apparatus tracking camera movement in Augmented Reality (AR) systems using structured light projections, the laser emitting light source for projecting structured light may be encased in a transistor outline can (TO can) package, a vertical cavity surface emitting laser (VCSEL), or a vertical external cavity surface emitting laser (VECSEL).

The present disclosure further describes a computer-readable storage medium having instructions stored thereon for tracking camera movement in Augmented Reality (AR) systems using structured light projections. The instructions may include projecting at least one structured light pattern from a structured light source onto a portion of an AR scene, detecting a reflected structured light pattern from one or more portions of the AR scene utilizing an image sensor in proximity of the AR image capture unit, performing a distance analysis on the at least one structured light pattern to determine the distance between the AR image capture unit and the one or more portions of the AR scene, determining a change in the AR image capture unit location based on the distance analysis of the detected structured light pattern, and correlating the change in the AR image capture unit location with one or more captured images of the AR scene.

According to some examples, the instructions may further include continuously tracking AR capture unit movement relative to the AR scene based on continuous determination of changes in the detected structured light pattern, and projecting the at least one structured light pattern from the structured light source onto a portion of the AR scene in pulses synchronized with an image capture of the AR image capture unit.

According to some examples, the instructions may further include projecting two or more structured light patterns on two or more portions of the AR scene for obtaining multiple samples of the AR scene.

According to further examples, the structured light source may be a laser emitting light source, the AR image capture unit may be a camera, and projection of the structured light pattern may be synchronized with an opening of a shutter of the AR camera. Alternatively, the instructions may include projecting the at least one structured light pattern from the structured light source onto a portion of the AR scene in pulses shorter than an image capture period of the AR image capture unit.

According to some examples, the instructions may further include encasing the structured light source for projecting structured light in a transistor outline can (TO can) package, collimating the light from the structured light source through a collimating lens, and applying a diffractive optical pattern after the collimating lens for producing the structured light pattern.

The present disclosure also describes a system for tracking camera movement in Augmented Reality (AR) systems using structured light projections. The system for tracking camera movement in Augmented Reality (AR) systems using structured light projections may include a camera adapted to capture a two dimensional (2D) image of a real scene, a laser source adapted to project at least one 2D laser pattern onto a portion of the real scene, a sensor adapted to detect a reflected 2D laser pattern from one or more portions of the real scene, an image processing module adapted to convert the 2D image to an image domain representation for generation of an AR image based on the real scene, and an AR module. The AR module may be adapted to perform a distance analysis on the at least one 2D laser pattern to determine the distance between the camera and the one or more portions of the real scene, determine a change in the camera location based on the distance analysis of the detected 2D laser pattern, and correlate the change in the camera location with one or more captured images of the real scene.

According to some examples of a system for tracking camera movement in Augmented Reality (AR) systems using structured light projections, the AR module may be further adapted to superimpose predefined graphical and/or textual data onto the image domain representation.

According to some examples of a system for tracking camera movement in Augmented Reality (AR) systems using structured light projections, the AR module may be further adapted to continuously track camera movement relative to the real scene based on continuous determination of changes in the detected 2D laser pattern, project the at least one 2D laser pattern from the laser source onto a portion of the real scene in pulses synchronized with a shutter opening of the camera, and/or project two or more 2D laser patterns on two or more portions of the real scene for obtaining multiple samples of the real scene.

According to some examples of a system for tracking camera movement in Augmented Reality (AR) systems using structured light projections, the 2D laser pattern may be one of a square shape, a rectangular shape, a trapezoidal shape, a circular shape, an elliptical shape, and a triangular shape.

According to some examples of a system for tracking camera movement in Augmented Reality (AR) systems using structured light projections, the 2D laser pattern may be array of dots, and a size of each dot and a distance between the dots may be determined based on an expected distance between the camera and the one or more portions of the real scene.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to track camera movement in Augmented Reality (AR) systems using structured light projections, the method comprising:

projecting at least one structured light pattern in pulses from a structured light source onto a portion of an AR scene, wherein the pulses are synchronized with an opening and a closing of a shutter of an AR image capture unit, and a duration of each pulse is shorter than an open shutter duration of the AR image capture unit in order to reduce a blur associated with a motion of the AR image capture unit, and wherein the at least one structured light pattern is projected by the structured light source when the structured light source is positioned in a same horizontal and a same vertical plane as the AR image capture unit to facilitate preservation of a consistent origination point of the at least one structured light pattern;

detecting a reflected structured light pattern from one or more portions of the AR scene utilizing an image sensor in proximity of the AR image capture unit;

comparing the detected structured light pattern to a previously detected structured light pattern;

determining a change in an AR image capture unit location based on a comparison;

correlating the change in the AR image capture unit location with one or more captured images of the AR scene; and tracking an AR image capture unit movement relative to the AR scene based on determination of changes in the detected structured light pattern.

2. The method according to claim 1, further comprising:
performing a distance analysis on the at least one structured light pattern to determine the distance between the AR image capture unit and the one or more portions of the AR scene; and
determining the AR image capture unit location based on the distance analysis of the detected structured light pattern.

3. The method according to claim 1, further comprising continuously tracking the AR image capture unit movement relative to the AR scene based on continuous determination of the changes in the detected structured light pattern.

4. The method according to claim 1, further comprising projecting two or more structured light patterns on two or more portions of the AR scene for obtaining multiple samples of the AR scene.

5. The method according to claim 1, wherein the structured light source is a laser emitting light source and the AR image capture unit is an AR camera.

6. The method according to claim 1, wherein the structured light pattern is an array of dots, and a size of each dot and a distance between the dots are determined based on an expected distance between the AR image capture unit and the one or more portions of the AR scene.

7. The method according to claim 1, wherein the structured light source, the image sensor, and the AR image capture unit are integrated as a portable AR camera.

8. The method according to claim 1, wherein the structured light pattern is projected in the same horizontal and vertical planes as the AR image capture unit.

9. The method according to claim 1, further comprising:
collimating the structured light through a collimating lens; and
applying a diffractive optical pattern after the collimating lens for producing the structured light pattern.

10. The method according to claim 1, wherein the structured light source is encased in a transistor outline can (TO can) package including, a vertical cavity surface emitting laser (VCSEL).

11. The method according to claim 1, further comprising configuring the structured light source to produce a laser light having a wavelength greater than about 800 nanometers and less than about 1000 nanometers.

12. An apparatus to track camera movement in Augmented Reality (AR) systems using structured light projections, the apparatus comprising:
a memory adapted to store instructions, image data, and graph data; and
a first processing unit adapted to execute a dynamic modeling module in conjunction with the instructions, wherein the dynamic modeling module is adapted to:
project at least one structured light pattern in pulses from a structured light source onto a portion of an AR scene, wherein the pulses are synchronized with an opening and a closing of a shutter of an AR camera, and a duration of each pulse is shorter than an open shutter duration of the AR camera in order to reduce a blur associated with a motion of the AR camera, and wherein the at least one structured light pattern is projected by the structured light source when the structured light source is positioned in a same horizontal and a same vertical plane as the AR camera to facilitate preservation of a consistent origination point of the at least one structured light pattern, and the at least one structured light pattern is configured to change in lateral dimensions as a function of distance from the AR camera;
detect a reflected structured light pattern from one or more portions of the AR scene utilizing an image sensor in proximity of the AR camera;
compare the detected structured light pattern to a previously detected structured light pattern;
determine a change in an AR camera location based on a comparison;
correlate the change in the AR camera location with one or more captured images of the AR scene; and
track an AR image capture unit movement relative to the AR scene based on determination of changes in the detected structured light pattern.

13. The apparatus according to claim 12, wherein the first processing unit is configured to change shape and size features of the at least one structured light pattern in lateral dimensions as a function of a distance between the one or more portions of the AR scene and the AR camera.

14. The apparatus according to claim 12, wherein a laser emitting light source for projecting structured light is encased in one of: a transistor outline can (TO can) package, a vertical cavity surface emitting laser (VCSEL), or a vertical external cavity surface emitting laser (VECSEL).

15. A non-transitory computer-readable storage medium having instructions stored thereon to track camera movement in Augmented Reality (AR) systems using structured light projections, the instructions comprising:
projecting at least one structured light pattern in pulses from a structured light source onto a portion of an AR scene, wherein the pulses are synchronized with an opening and a closing of a shutter of an AR image capture unit and a duration of each pulse is shorter than an open shutter duration of the AR image capture unit in order to reduce a blur associated with a motion of the AR image capture unit, and wherein the at least one structured light, pattern is projected by the structured light source when the structured light source is positioned in a same horizontal and a same vertical plane as the AR image capture unit to facilitate preservation of a consistent origination point of the at least one structured light pattern;
detecting a reflected structured light pattern from one or more portions of the AR scene utilizing an image sensor in proximity of the AR image capture unit;
performing a distance analysis on the at least one structured light pattern to determine the distance between the AR image capture unit and the one or more portions of the AR scene;
determining a change in an AR image capture unit location based on the distance analysis of the detected structured light pattern;
correlating the change in the AR image cap unit location with one or more captured images of the AR scene; and
tracking an AR image capture unit movement relative to the AR scene based on determination of changes in the detected structured light pattern.

16. The non-transitory computer-readable storage medium of claim 15, wherein the instructions further comprise continuously tracking the AR image capture unit movement relative to the AR scene based on continuous determination of the changes in the detected structured light pattern.

17. The non-transitory computer-readable storage medium of claim 15, wherein the instructions further comprise:
- encasing the structured light source for projecting structured light in a transistor outline can (TO can package;
- collimating the light from the structured light source through a collimating lens, and
- applying a diffractive optical pattern after the collimating lens for producing the structured light pattern.

18. A system to track camera movement in Augmented Reality (AR) systems using structured light projections, comprising:
- a camera adapted to capture a two dimensional (2D) image of a real scene;
- a laser source adapted to project at least one 2D laser pattern in pulses onto a portion of the real scene, wherein the pulses are synchronized with an opening and it closing of a shutter of the camera, and a duration of each pulse is shorter than an open shutter duration of the camera in order to reduce a blur associated with a motion of the camera, and wherein the at least one 2D laser pattern is projected by the laser source when the laser source is positioned in a same horizontal and a same Vertical plane as the camera to facilitate preservation of a consistent origination point of the at least one 2D laser pattern;
- a sensor adapted to detect a reflected 2D laser pattern from one or more portions of the real scene;
- an image processing module adapted to convert the 2D image to an image domain representation for generation of an AR image based on the real scene; and
- an AR module adapted to:
  - perform a distance analysis on the at least one 2D laser pattern to determine the distance between the camera and the one or more portions of the real scene;
  - determine a change in a camera location based on the distance analysis of the detected 2D laser pattern;
  - correlate the change in the camera location with one or more captured images of the real scene; and
  - track a camera movement relative to the real scene based on determination of changes in the detected 2D laser pattern.

19. The system according to claim 18, wherein the AR module is further adapted to superimpose predefined graphical and/or textual data onto the image domain representation.

20. The system according to claim 18, wherein the AR module is further adapted to
- continuously track the camera movement relative to the real scene based on continuous determination of the changes in the detected 2D laser pattern; and/or
- project two or more 2D laser patterns on two or more portions of the real scene for obtaining multiple samples of the real scene.

21. The system according to claim 18, wherein the 2D laser pattern has one of a square shape, a rectangular shape, a trapezoidal shape, a circular shape, an elliptical shape, and a triangular shape.

22. The system according to claim 21, wherein the 2D laser pattern is an array of dots, and a size of each dot and a distance between the dots are determined based on an expected distance between the camera and the one or more portions of the real scene.

* * * * *

UNITED STATES PATENT AND TRADEMARK OFFICE
CERTIFICATE OF CORRECTION

| | | |
|---|---|---|
| PATENT NO. | : 9,245,307 B2 | |
| APPLICATION NO. | : 13/381329 | |
| DATED | : January 26, 2016 | |
| INVENTOR(S) | : Margalit | |

It is certified that error appears in the above-identified patent and that said Letters Patent is hereby corrected as shown below:

In The Drawings

In Fig. 3, Sheet 3 of 9, delete Fig. 3 and insert Fig. 3, as shown on the attached drawing sheet 3 of 9.

In The Specification

In Column 1, Line 9, delete "§371" and insert -- § 371 --, therefor.

In The Claims

In Column 21, Line 42, in Claim 10, delete "including, a" and insert -- including a --, therefor.

In Column 22, Line 37, in Claim 15, delete "unit and" and insert -- unit, and --, therefor.

In Column 22, Line 41, in Claim 15, delete "light, pattern" and insert -- light pattern --, therefor.

In Column 22, Line 57, in Claim 15, delete "cap unit" and insert -- capture unit --, therefor.

In Column 22, Line 63, in Claim 16, delete "comprise" and insert -- comprise: --, therefor.

In Column 23, Line 4, in Claim 17, delete "(TO can" and insert -- (TO can) --, therefor.

In Column 23, Line 6, in Claim 17, delete "lens, and" and insert -- lens; and --, therefor.

In Column 23, Lines 17-18, in Claim 18, delete "it closing" and insert -- a closing --, therefor.

Signed and Sealed this
Nineteenth Day of July, 2016

Michelle K. Lee
*Director of the United States Patent and Trademark Office*

CERTIFICATE OF CORRECTION (continued)
U.S. Pat. No. 9,245,307 B2

In Column 23, Line 24, in Claim 18, delete "Vertical" and insert -- vertical --, therefor.

In Column 24, Line 15, in Claim 20, delete "adapted to" and insert -- adapted to: --, therefor.